May 1, 1934.  J. W. BRYCE  1,957,198
SCALE
Filed Sept. 5, 1928  2 Sheets-Sheet 1

Inventor
James W. Bryce
By his Attorney
W. M. Wilson

May 1, 1934.                J. W. BRYCE                1,957,198
                              SCALE
                    Filed Sept. 5, 1928        2 Sheets-Sheet 2
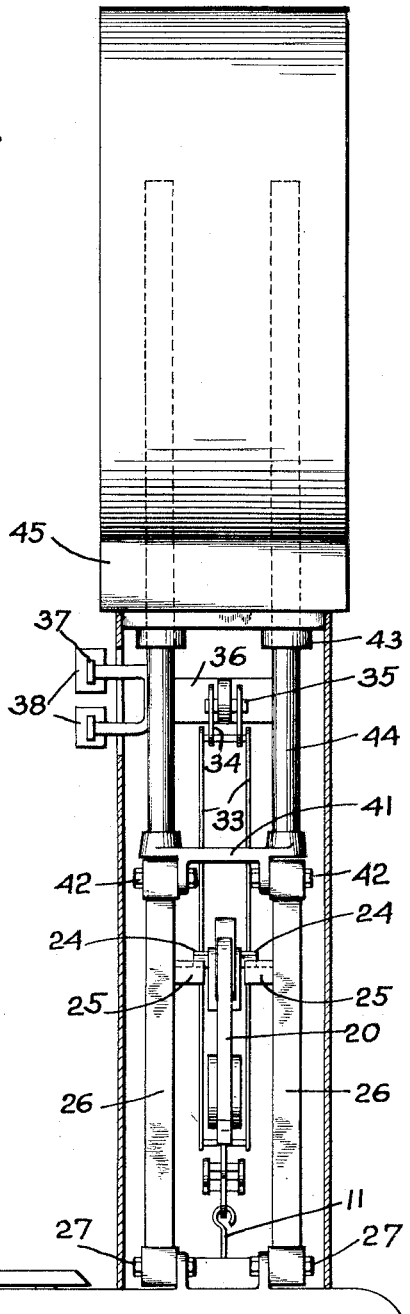
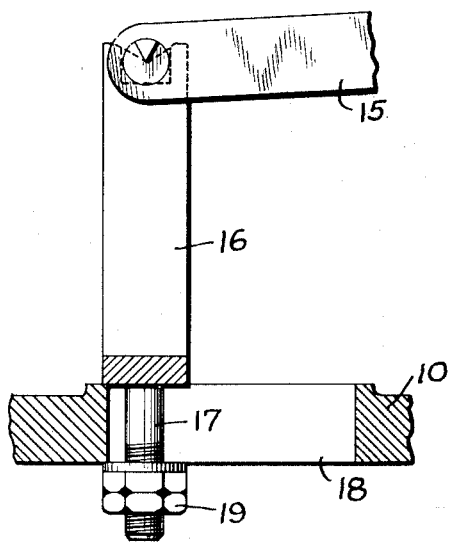
Inventor
James W. Bryce
By his Attorney
W. M. Wilson Patented May 1, 1934

1,957,198

UNITED STATES PATENT OFFICE 1,957,198

SCALE

James W. Bryce, Bloomfield, N. J., assignor, by mesne assignments, to International Business Machines Corporation, New York, N. Y., a corporation of New York Application September 5, 1928, Serial No. 304,136

6 Claims. (Cl. 265—62)

This invention relates to improvements in weighing scales and particularly to structural details thereof.

The object of the invention is to provide a scale consisting of separate sections or units which may be easily assembled and disassembled.

Further, the object of the invention is to provide a scale structure wherein the scale housings may be formed more economically and of sheet metal.

Still further, the object of the invention is to provide novel supporting means for the counterbalancing and indicating mechanisms, said means being independent of the housings.

Another object is to provide a scale structure enabling different size housings to be interchangeably used.

Still another object is to provide novel means for enabling the scale capacity to be changed.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a side elevation of the scale with the intermediate housing sectioned and Fig. 3 is a detail of the auxiliary lever and its fulcrum support.

Figure 1:
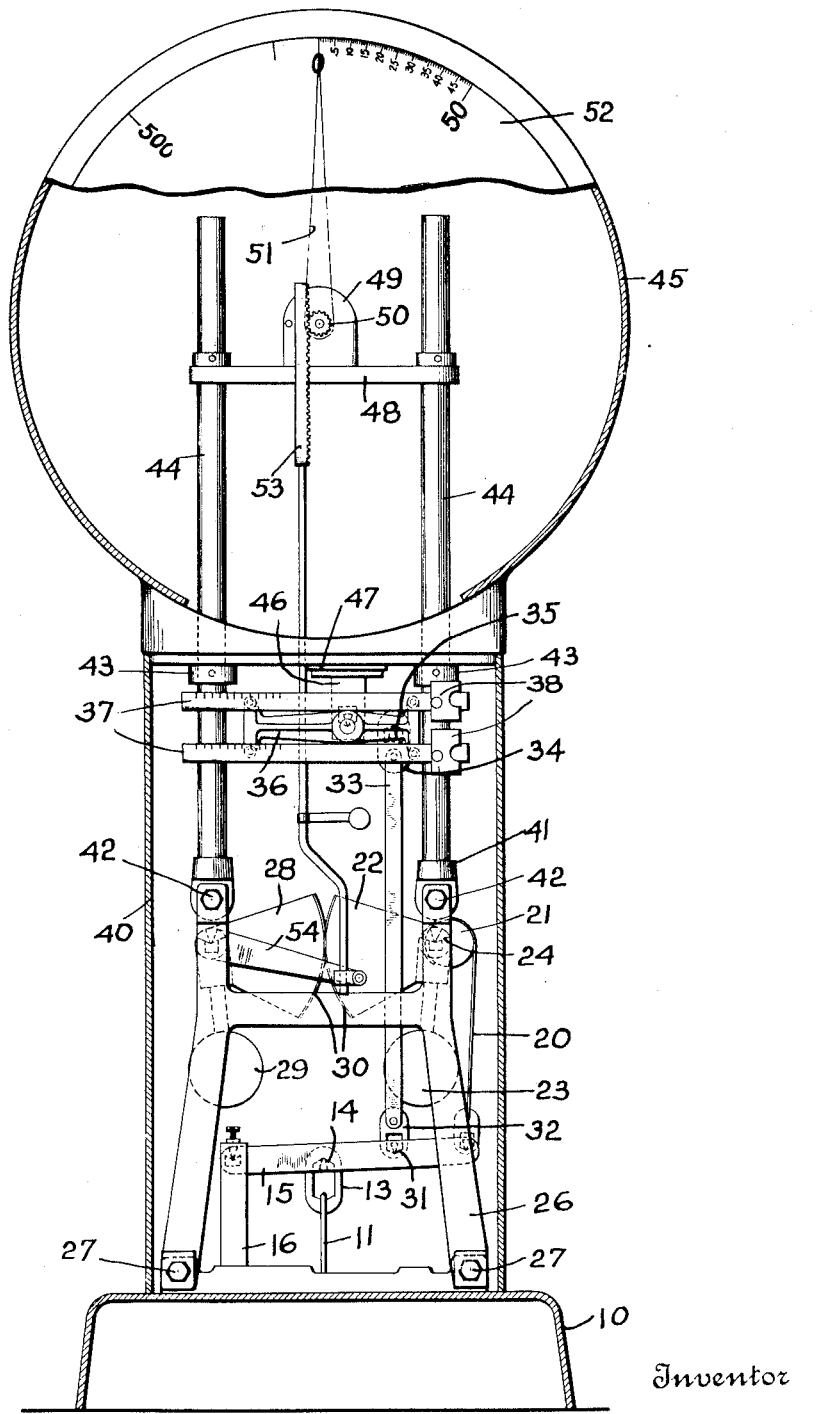
Fig. 1 is a front elevation of the scale with the housings sectioned.

The scale comprises a base 10 containing suitable base levers (not shown) for moving the draft rod 11 in proportion to the load on the platform 12. The draft rod is hooked to a connecting stirrup 13 which bears on a knife edge pivot 14 of a lever 15. The latter is fulcrumed at one end on a standard 16 which has a bolt 17 (Fig. 3) fastened to its under side. The bolt passes through a slot 18 in the base 10 and serves to adjustably fasten the standard in the slot by nuts 19 threaded on the bolt.

The purpose of providing an adjustable fastening of the standard to the base is to permit the use of different length levers 15 thereby to change the capacity of the scale. The active end of the lever 15 is connected to a tape 20 which is fastened to the periphery of a cam 21 rigid with a segment 22 and a pendulum 23. The pendulum structure has knife edges 24 projecting from each side of the cam 21, which knife edges rest in V-shaped grooved bearings 25, each fast to one side of one of a pair of frame pieces 26. The latter are detachably fastened to the base by bolts 27 (see Fig. 2). A second pendulum structure comprising a segment 28 and a pendulum 29 similar to segment 22 and pendulum 23 respectively is pivoted in a similar manner to the other side of the frame pieces 26. Tapes 30 interconnect the opposite ends of the arcuate surfaces of the segments which face each other in substantial rolling contacts, thus insuring that the movement of one segment will cause similar movement of the other segment.

Intermediate the active end of the lever and the knife edge 14 thereon is a knife edge 31 bearing on the bottom of a stirrup 32 pivotally connected to the lower ends of rigidily joined vertical links 33. The upper ends of the links are in turn connected to a stirrup 34 which rests in a knife edge 35 fast to a tare lever 36. Rigid with the lever are the graduated beams 37 on which are mounted the poises 38 for adjusting the amount of tare.

A sheet metal housing 40 rests on the base and encloses the parts above the base including the pieces 26, the lever 15, the pendulum structures and the tare lever. The tare beams extend outside of the housing as shown in Fig. 2 to permit manipulation of the poises.

A pair of pipe frames 41 are fastened by bolts 42 to the upper ends of the frame pieces 26. Sleeves 43 are adjustably mounted intermediate the ends of the pipe lengths 44. The dial housing 45 rests on these sleeves and on the upper edge of the housing 40. The tare lever 36 is fulcrumed on a bearing post 46 depending from a plate 47 fastened to the bottom of the dial housing.

The pipe lengths 44 have adjustably fastened thereto a horizontal frame member 48 carrying a vertical plate 49 in which is rotatably journalled a pinion 50 on which is mounted the indicator 51 cooperating with the dial chart 52 carried by the dial housing. A rack 53 meshes with the pinion and is pivotally connected at its lower end to an arm 54 rigidly mounted on the hub of the segment 28. The arm 54 moves in unison with the pendulum structures and actuates the rack 53 accordingly to rotate the pinion 50 and indicator 51.

By adjusting the position of the indicator frame bar 48, it is possible to use dial housings and charts of different dimensions, the center of pinion 50 being required to be at the center of the chart. By using a different length housing 40 and adjusting the sleeves 43 and the bar 48, it is possible to adjust the height of the dial housing in accordance with specified conditions. The rack 53 will be of a length suited to the height of the dial housing above the pendulums.

All of the scale parts except the tare beams and the dial chart are mounted independently of the intermediate housing and the dial housing 45, permitting the housings to be made as simple sheet metal stampings which may be removed bodily from the scale without disturbing the weighing members of the scale such as the pendulums and indicator elements.

It is obvious that the housing 45 may be supported wholly on the intermediate housing 40, the sleeves 43 being omitted.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. A scale comprising a base, a frame mounted thereon, a plurality of uprights carried by said frame, an indicator, a supporting frame for the indicator including sockets fitted over and vertically adjustably secured to the aforementioned uprights, and weighing mechanism mounted on the first-mentioned frame and connected to the indicator for actuating it.

2. A scale such as defined in claim 1, said uprights comprising pipe sections, fittings in which the lower ends of said pipe sections are received, and means for detachably securing the fittings to the upper end of said first-mentioned frame.

3. A scale comprising a base housing, a frame carried thereby for supporting weighing mechanism, said frame including uprights, socketed members adjustably secured to the uprights, an indicator and support therefor secured to the uprights, and a housing for the indicator and its support resting on said socketed members.

4. A scale such as defined in claim 3, and a housing for the frame and weighing mechanism mounted on the base housing and engaging the lower end of the indicator housing to help support the latter.

5. A scale comprising a base housing, a frame supported thereby, pendulums supported by the frame and completely sealed and in condition for weighing, an intermediate one-piece housing open at both ends and movable over the entire weighing mechanism and frame into position on the base housing by which it is supported, an upper one-piece housing open at the lower end and positionable over the upper part of the weighing mechanism into engagement with the intermediate housing by which it is supported, an indicator wholly supported by the frame and connected to the pendulums adapted to be enclosed by said upper housing, the latter being provided with a chart for cooperation with the indicator, said frame including posts, and socketed members adapted to be adjustably secured to the posts after the intermediate housing has been positioned on the base for helping support the upper housing.

6. A scale comprising a base housing, a frame mounted thereon, counterbalancing pendulums fulcrumed on said frame, a lever below the pendulums and connected thereto for actuating the pendulums, a tare beam above the pendulums, a connection from the lever to the tare beam, an indicator above the tare beam, a support for the indicator mounted on said frame, and a connection separate from the connection of the lever to the tare beam extending from the pendulums to the indicator.

JAMES W. BRYCE.